(12) United States Patent
Xu et al.

(10) Patent No.: US 10,488,705 B2
(45) Date of Patent: Nov. 26, 2019

(54) ELECTRONIC DEVICES WITH BACKLIT DISPLAYS

(71) Applicant: Apple Inc., Cupertino, CA (US)

(72) Inventors: Daming Xu, Santa Clara, CA (US); Heesang Suh, Saratoga, CA (US); Mookyung Son, Cupertino, CA (US); Wenyong Zhu, San Jose, CA (US); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/974,590

(22) Filed: May 8, 2018

(65) Prior Publication Data

US 2018/0307100 A1    Oct. 25, 2018

Related U.S. Application Data

(63) Continuation-in-part of application No. 15/688,736, filed on Aug. 28, 2017.

(60) Provisional application No. 62/487,082, filed on Apr. 19, 2017.

(51) Int. Cl.
*G02F 1/1335* (2006.01)
*G02F 1/1337* (2006.01)
*F21V 8/00* (2006.01)

(52) U.S. Cl.
CPC ..... *G02F 1/133603* (2013.01); *G02B 6/0031* (2013.01); *G02B 6/0036* (2013.01); *G02B 6/0055* (2013.01); *G02B 6/0073* (2013.01); *G02B 6/0088* (2013.01); *G02F 1/133504* (2013.01); *G02F 1/133611* (2013.01); *G02F 1/133615* (2013.01); *G02F 1/133711* (2013.01)

(58) Field of Classification Search
CPC .... G02F 1/1336–133615; G02B 6/0081–0091
See application file for complete search history.

(56) References Cited

U.S. PATENT DOCUMENTS

| | | | |
|---|---|---|---|
| 8,508,694 | B2 | 8/2013 | Zhu |
| 8,797,474 | B2 | 8/2014 | Wurzel |
| 8,941,795 | B2 | 1/2015 | Garelli et al. |
| 9,274,359 | B2 | 3/2016 | Qian et al. |
| 9,316,779 | B1 * | 4/2016 | Hou ............... G02B 6/0031 |
| 9,551,823 | B2 * | 1/2017 | Lin ............... G02B 6/0031 |

(Continued)

FOREIGN PATENT DOCUMENTS

| | | | |
|---|---|---|---|
| CN | 1892345 A | * | 1/2007 |
| JP | 2005251687 A | * | 9/2005 |

(Continued)

*Primary Examiner* — Mariceli Santiago
(74) *Attorney, Agent, or Firm* — Treyz Law Group, P.C.; G. Victor Treyz; David K. Cole

(57) ABSTRACT

A display may have a backlight unit that provides backlight illumination. The backlight unit may include a light guide that distributes light through the display. Light-emitting diodes may emit light into the light guide. A reflector that is overlapped by the light guide may help reflect light upwards through an array of pixels. The backlight unit may have a chassis that receives the reflector, light guide, light-emitting diodes, and optical films such as diffusers and prism films. Optical and mechanical features in the backlight unit may enhance color and intensity uniformity for the backlight illumination and may help enhance durability.

18 Claims, 18 Drawing Sheets

(56) References Cited

U.S. PATENT DOCUMENTS

| | | | |
|---|---|---|---|
| 9,759,937 B2 | 9/2017 | Reightler et al. | |
| 9,835,793 B2 | 12/2017 | Zhu et al. | |
| 9,857,521 B2 | 1/2018 | Pu et al. | |
| 9,897,738 B2* | 2/2018 | Song | G02B 6/0031 |
| 2003/0223218 A1* | 12/2003 | Kawakami | G02B 6/0023 349/65 |
| 2013/0258247 A1* | 10/2013 | Tang | G02B 6/0023 349/65 |
| 2015/0280075 A1* | 10/2015 | Chang | H01L 33/44 257/88 |
| 2016/0092030 A1 | 3/2016 | Byun et al. | |
| 2016/0306090 A1 | 10/2016 | Pu et al. | |
| 2017/0219758 A1 | 8/2017 | Jang et al. | |

FOREIGN PATENT DOCUMENTS

| | | | |
|---|---|---|---|
| JP | 2009004198 A | * | 1/2009 |
| JP | 2016122539 A | * | 7/2016 |

* cited by examiner

ELECTRONIC DEVICES WITH BACKLIT DISPLAYS

This application is a continuation-in-part of patent application Ser. No. 15/688,736, filed on Aug. 28, 2017, which is hereby incorporated by reference in its entirety and which claims the benefit of provisional patent application No. 62/487,082, filed on Apr. 19, 2017, which is hereby incorporated by reference herein in its entirety.

BACKGROUND

This relates generally to electronic devices with displays, and, more particularly, to backlit displays.

Electronic devices often include displays. Backlit displays such as backlit liquid crystal displays include backlight units. A backlight unit produces light that travels outwardly through an array of pixels in a display. The pixels modulate the intensity of the light from the backlight unit to create images on the display.

Backlight units help ensure that displays can display images in a wide variety of ambient lighting conditions. If care is not taken, however, the backlight illumination from a backlight unit will not be uniform and the structures in the backlight unit will not be sufficiently robust.

SUMMARY

A display may have a backlight unit that provides backlight illumination. The backlight unit may include a light guide that distributes light through the display. Light-emitting diodes may emit light into the light guide. A reflector that is overlapped by the light guide may help reflect light upwards through an array of pixels. The backlight unit may have a chassis that receives the reflector, light guide, light-emitting diodes, and optical films such as diffusers and prism films. Optical and mechanical features in the backlight unit may enhance color and intensity uniformity for the backlight illumination and may help enhance durability.

A black paint layer and blue material may be placed along an edge of the light guide to reduce light reflections and color-correct backlight illumination that has reflected from the chassis. The black paint layer may be formed on the underside of a portion of a diffuser. The blue material may be provided in the form of blue tape affixed to the chassis. If desired, materials of other colors may be placed along the edge of the light guide for color correction (e.g., yellow material such as yellow paint, yellow tape, yellow plastic, red material such as red paint, red tape, red plastic, orange material such as orange paint, orange tape, orange plastic, etc.). The use of blue color corrective material is sometimes described herein as an example. In general, material of any suitable color for color correction may be used.

A reflector strip may overlap a printed circuit to which the light-emitting diodes are mounted. The reflector strip may have an edge that is separated by a gap from an edge of the reflector under the light guide. The gap may expose a portion of a metal layer in the chassis. Optically clear adhesive may be used to attach the light guide layer to the reflector strip. The optically clear adhesive may give rise to light leakage from the light guide that helps eliminate a dark band in the backlight illumination that might otherwise arise from the exposure of the metal layer by the presence of the gap.

An additional reflector strip may be interposed between a metal portion of the chassis that overhangs the light-emitting diodes and the light-emitting diodes. The additional reflector strip may help prevent moisture from reaching the light-emitting diodes and potentially damaging phosphor on the light-emitting diodes.

A layer of foam may be interposed between the edge of the light guide layer and the chassis. The foam layer may be overlapped by a polymer layer and may be attached using adhesive. During drop events, the foam layer may help cushion light guide layer impacts with the chassis and may help to reduce particle formation.

The light guide layer may have upper and lower coating layers with light scattering features. The light scattering features on the lower coating layer may be characterized by a first peak-to-valley distance. Antifriction protrusions on the lower coating layer may be characterized by a second peak-to-valley distance that is larger than the first peak-to-valley distance. The antifriction protrusions may help prevent sticking between the light guide layer and the reflector.

The light guide layer and/or an adjacent diffuser layer in the backlight unit may be configured to reduce white spots by forming one or both of these layers from hard materials. The light guide layer may also be intentionally cupped with a concave surface facing the pixel array and the chassis may be provided with a matting curvature near the edges of the display.

A light adjustment layer may be provided beneath a backlight mixing region of the light guide layer. The light adjustment layer may include patterned regions having different levels of reflectivity to help reduce backlight intensity nonuniformities.

DETAILED DESCRIPTION

Figure 1:
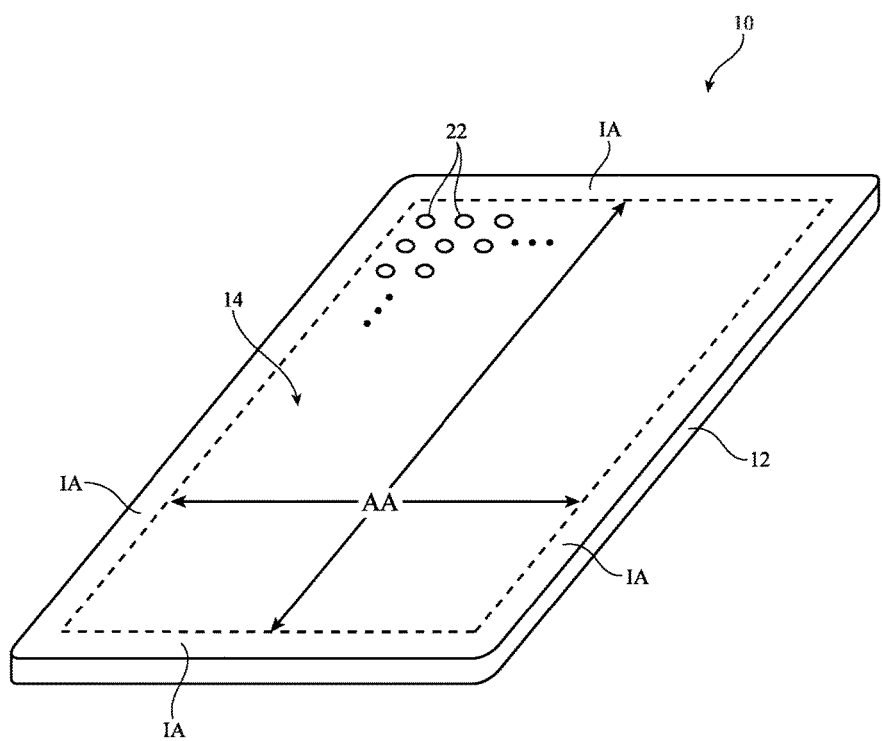
FIG. 1 is a perspective view of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a computer display that does not contain an embedded computer, a computer display that includes an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, watch or other wrist device, or other portable computing device. Other configurations may be used for device 10 if desired. The example of FIG. 1 is merely illustrative.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. A touch sensor may be formed using electrodes or other structures on a display layer that contains a pixel array or on a separate touch panel layer that is attached to the pixel array (e.g., using adhesive).

Display 14 may include an array of pixels 22. The array of pixels in display 14 may form an active area such as rectangular active area AA of FIG. 1 in which images are displayed for a user. One or more edges of active area AA may be bordered by an inactive area that is free of pixels such as inactive areas IA. Borderless designs for display 14 and arrangements in which active area AA is bordered only on two sides by inactive areas IA may be used, if desired.

Pixels 22 may be formed from liquid crystal display (LCD) components, an array of electrophoretic pixels, an array of electrowetting pixels, or pixels based on other display technologies. Configurations in which display 14 is a liquid crystal display with a backlight are sometimes described herein as an example. This use of liquid crystal display technology for forming display 14 is merely illustrative. Display 14 may, in general, be formed using any suitable type of pixels.

Display 14 may be protected using a display cover layer such as a layer of transparent glass or clear plastic. Openings may be formed in the display cover layer. For example, an opening may be formed in the display cover layer to accommodate a button, a speaker port, or other component. Openings may be formed in housing 12 to form communications ports (e.g., an audio jack port, a digital data port, etc.), to form openings for buttons, etc.

Figure 2:
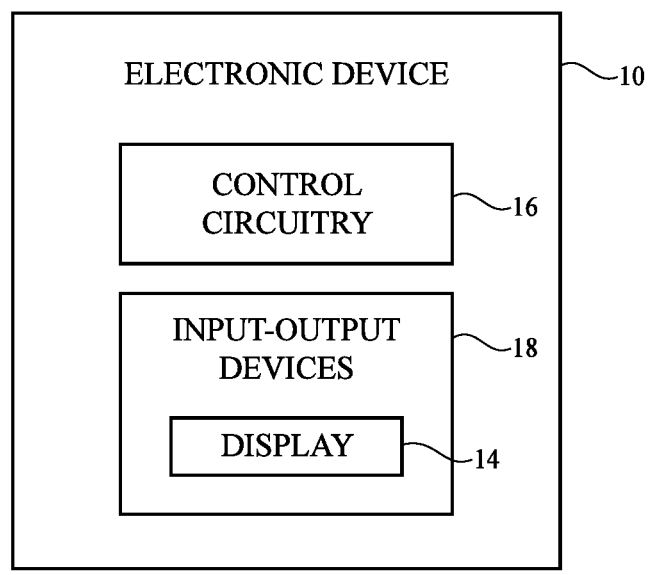
FIG. 2 is a schematic diagram of an illustrative electronic device having a display in accordance with an embodiment.

FIG. 2 is a schematic diagram of device 10. As shown in FIG. 2, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 18 may be used to allow data to be supplied to device 10 and to allow data to be provided from device 10 to external devices. Input-output devices 18 may include buttons, joysticks, scrolling wheels, touch pads, key pads, keyboards, microphones, speakers, tone generators, vibrators, cameras, sensors (e.g., ambient light sensors, proximity sensors, orientation sensors, magnetic sensors, force sensors, touch sensors, pressure sensors, fingerprint sensors, etc.), light-emitting diodes and other status indicators, data ports, etc. A user can control the operation of device 10 by supplying commands through input-output devices 18 and may receive status information and other output from device 10 using the output resources of input-output devices 18. Input-output devices 18 may include one or more displays such as display 14.

Control circuitry 16 may be used to run software on device 10 such as operating system code and applications. During operation of device 10, the software running on control circuitry 16 may display images on display 14 using an array of pixels in display 14. While displaying images, control circuitry 16 may control the transmission of each of the pixels in the array and can make adjustments to the amount of backlight illumination for the array that is being produced by backlight structures in display 14.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 3:
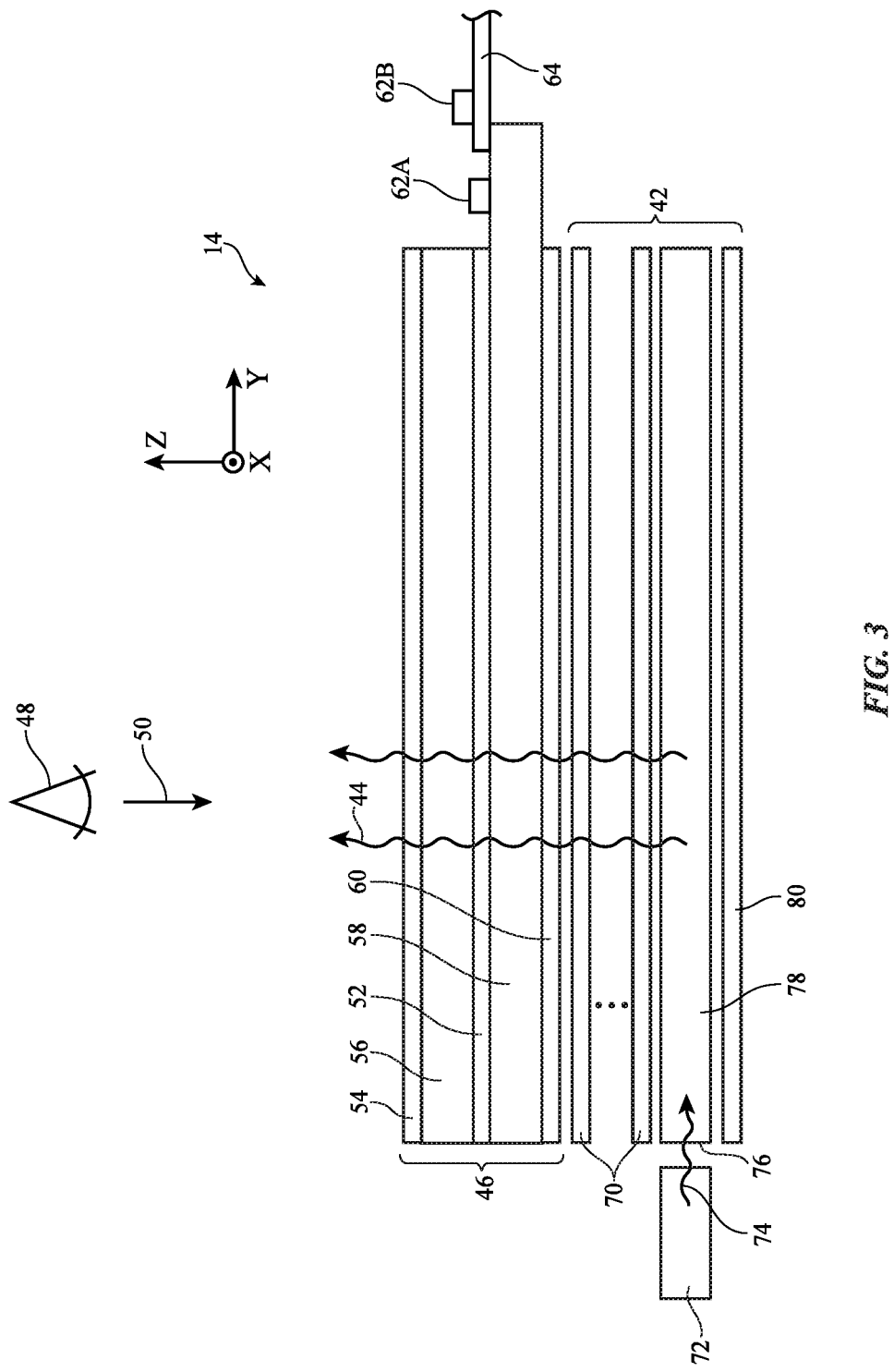
FIG. 3 is a cross-sectional side view of an illustrative display in accordance with an embodiment.

A cross-sectional side view of display 14 is shown in FIG. 3. As shown in FIG. 3, display 14 may include backlight structures such as backlight unit (backlight) 42 for producing backlight such as backlight illumination 44. During operation, backlight illumination 44 travels outwards (vertically upwards in dimension Z in the orientation of FIG. 3) and passes through display pixel structures in display layers 46. This illuminates any images that are being produced by the display pixels for viewing by a user. For example, backlight illumination 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer in the upper or lower portion of display 14 may also be used.

During operation of display 14 in device 10, control circuitry (e.g., one or more integrated circuits on a printed circuit) may be used to generate information to be displayed on display 14 (e.g., display data). The information to be displayed may be conveyed to one or more display driver integrated circuits such as illustrative circuit 62A or illustrative circuit 62B using a signal path such as a signal path formed from conductive metal traces in a rigid or flexible printed circuit such as printed circuit 64 (as an example).

Backlight structures 42 may include a light guide layer such as light guide layer 78 (sometimes referred to as a light guide structure or light guide). Light guide layer 78 may be formed from one or more layers of transparent material such as clear glass or plastic. For example, light guide layer 78 may be a molded polymer that forms a light guide plate or may be a thin flexible polymer film produced in a roll-to-roll process or other process. Light guide layer 78 may be coated on one or both sides with polymer coating layers to form features such as light scattering features. During operation of backlight structures 42, light sources such as light source 72 may generate light that creates backlight illumination 44. In the example of FIG. 3, light source 72 is located along the left edge of display 14. If desired, light sources can be provided along two or more edges of display 14.

Light source 72 may include an array of light-emitting diodes. The light-emitting diodes may run along one or more edges of light guide layer 78 such as edge 76 of light guide layer 78 (i.e., into the page along the X axis in the orientation of FIG. 3). Light-source 72 may emit light 74 into edge 76 of light guide layer 78. Light 74 may be distributed throughout light guide layer 78 due to the principal of total internal reflection. In the arrangement of FIG. 3, light 74 propagates to the right (in the positive Y direction) in light guide layer 78 and spreads out in dimension X. Light scattering features (protrusions, recesses, etc.) may be incorporated into light guide layer 78 (e.g., on the upper and/or lower surface of layer 78) to scatter light from layer 78. For example, bumps, ridges, and other protrusions, indentations, grooves, and other recesses, and/or other irregular surface features may be provided on the upper surface and/or lower surface of light guide layer 78 (e.g., in coating layers on the upper and lower surfaces of layer 78) to serve as a light scattering features.

Light that is scattered upwards in direction Z from light guide layer 78 may serve as backlight illumination 44 for display 14. Light that scatters downwards may be reflected back in the upwards direction by reflector 80. Reflector 80 may be formed from a reflective material such as a layer of plastic covered with a dielectric mirror thin-film coating. To enhance backlight performance for backlight structures 42, backlight structures 42 may include optical films 70. Optical films 70 may include diffuser layers for helping to homogenize backlight illumination 44 and thereby reduce hotspots and light collimating films such as prism films (sometimes referred to as brightness enhancement films) for directing backlight illumination 44 towards direction Z. Optical films 70 may overlap the other structures in backlight unit 42 such as light guide layer 78 and reflector 80. For example, if light guide layer 78 has a rectangular footprint in the X-Y plane of FIG. 3, optical films 70 and reflector 80 may have a matching rectangular footprint. If desired, films such as compensation films may be incorporated into other layers of display 14 (e.g., a reflective polarizer layer). With one illustrative configuration, there are four films 70 in backlight 42. The lowermost of the four films and the uppermost of the four films may be diffuser layers (sometimes referred to as diffusers) and the middle two films may be prism films. Other arrangements for films 70 may be used, if desired.

Figure 4:
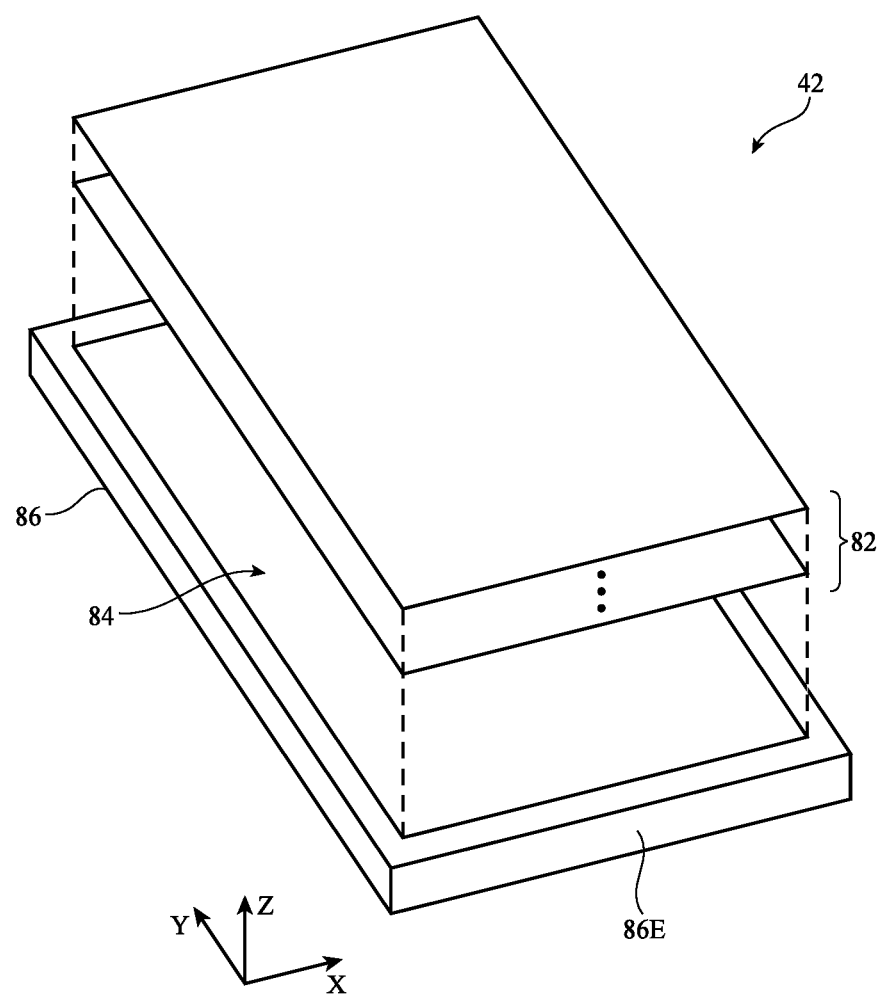
FIG. 4 is an exploded perspective view of illustrative backlight structures in accordance with an embodiment.

The structures of backlight 42 may be mounted in a chassis or other support structures (e.g., portions of housing 12, etc.). As shown in FIG. 4, for example, backlight layers 82 (e.g., films 70, light guide layer 78, and/or reflector 80) may be received within rectangular opening 84 of backlight chassis 86. Chassis 86 may have a rectangular ring shape and may be formed from materials such as metal (e.g., a sheet metal structure with features formed by bending and/or cutting) and/or polymer (e.g., plastic that is molded over the metal). Edge portions of one or more of the layers of display 14 (e.g., layers 82) may protrude under one or more structures along edge portion 86E of chassis 86 (e.g., under overhanging metal chassis and/or plastic chassis structures). A strip of light-emitting diodes in light source 72 may also be mounted under overlapping portions of chassis 86 such as chassis structures in edge portion 86E.

Figure 5:
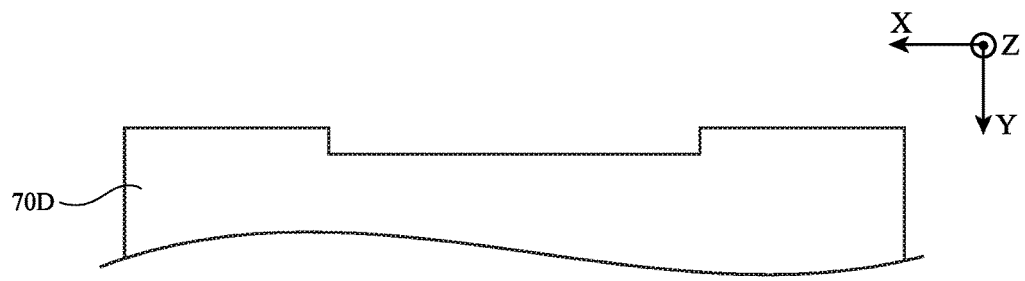
FIG. 5 is a top view of an edge portion of an illustrative diffuser layer in accordance with an embodiment.
Figure 6:
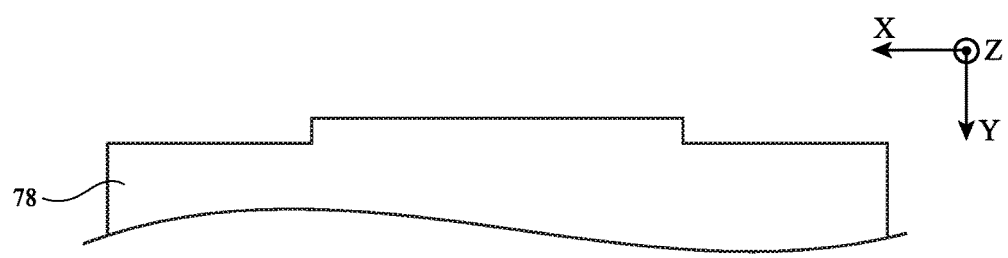
FIG. 6 is a top view of an edge portion of an illustrative light guide layer in accordance with an embodiment.

If desired, one or more of the layers in backlight 42 may have notches. As shown in FIG. 5, for example, diffuser layers such as diffuser 70D may have left and right protrusions separated by a central notch. In some embodiments, protruding edge portions of diffuser 70D may be captured under an overhanging portion of edge 86E of chassis 86. Light guide 78 may, if desired, have left and right notches separated by a central protrusion. In some embodiments, a central protruding edge portion of light guide 78 may protrude under an overhanging portion of edge portion 86E of chassis 86 and may be coupled to underlying structures in backlight 42.

Figure 7:
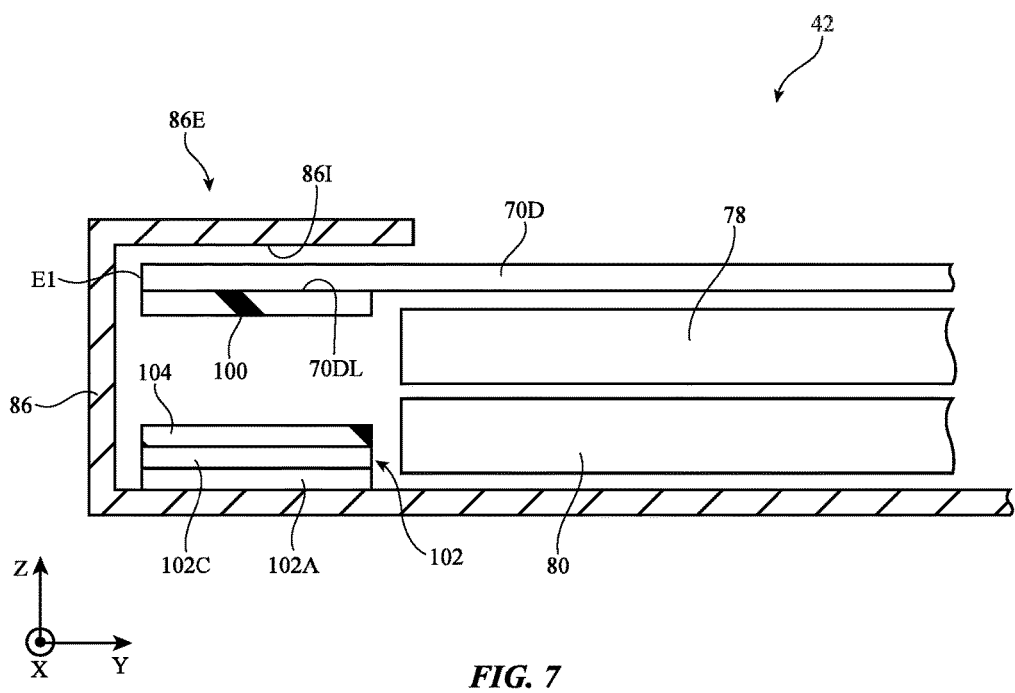
FIG. 7 is a cross-sectional side view of an illustrative edge portion of a backlight in accordance with an embodiment.

FIG. 7 is a cross-sectional side view of an edge portion of backlight 42 showing how diffuser 70D (e.g., one of the protruding portions of diffuser 70D of FIG. 5) may overlap the edge of light guide plate 78. Inner surface 86I of chassis 86 may be formed from metal (e.g., sheet metal) and may be reflective. To prevent excess light reflection that could give rise to a bright band in backlight illumination 44 along the peripheral edge of display 14, inner (lower) surface 70DL of diffuser 70D may be covered with light absorbing coating 100. Coating 100 may, for example, be a layer of black paint (ink) or other light-absorbing material. The presence of coating 100 may suppress excessive light reflections from surface 86I.

Exposed chassis surfaces (e.g., metal surfaces such as inner surface 86I) may absorb more blue light than red light, causing reflected light to be reddish or to have other undesired color casts. Colored material such as blue material may be formed on chassis 86 or other structures along the edge of light guide layer 78 to help color correct backlight illumination 44 along the edge of display 14. As shown in FIG. 7, color correcting material may be provided as a coating (coating 104) on tape 102. Tape 102 (e.g., single sided adhesive tape with a downwardly-facing adhesive layer 102A on carrier layer 102C) may, for example, be provided with a color-correcting coating such as blue paint (e.g., blue paint forming coating 104) or paint of other suitable colors. Blue coating material such as coating 104 may help color correct the reflecting light (making the reddish light bluer) so that backlight illumination 44 has a desired white color along the edge of backlight 42. If desired, tape 102 and blue coating 104 may be attached to other portions of chassis 86 along the edge of backlight 42, black coating 100 may be formed on other portions of chassis 86 along the edge of backlight 42, the positions of coating 100 and coating 104 may be swapped, and/or other configurations may be used for incorporating stray light color and stray light intensity adjustment structures into display 14 to adjust the light intensity and color of peripheral portions of backlight illumination 44 in backlight 42. The configuration of FIG. 7 is illustrative.

Figure 8:
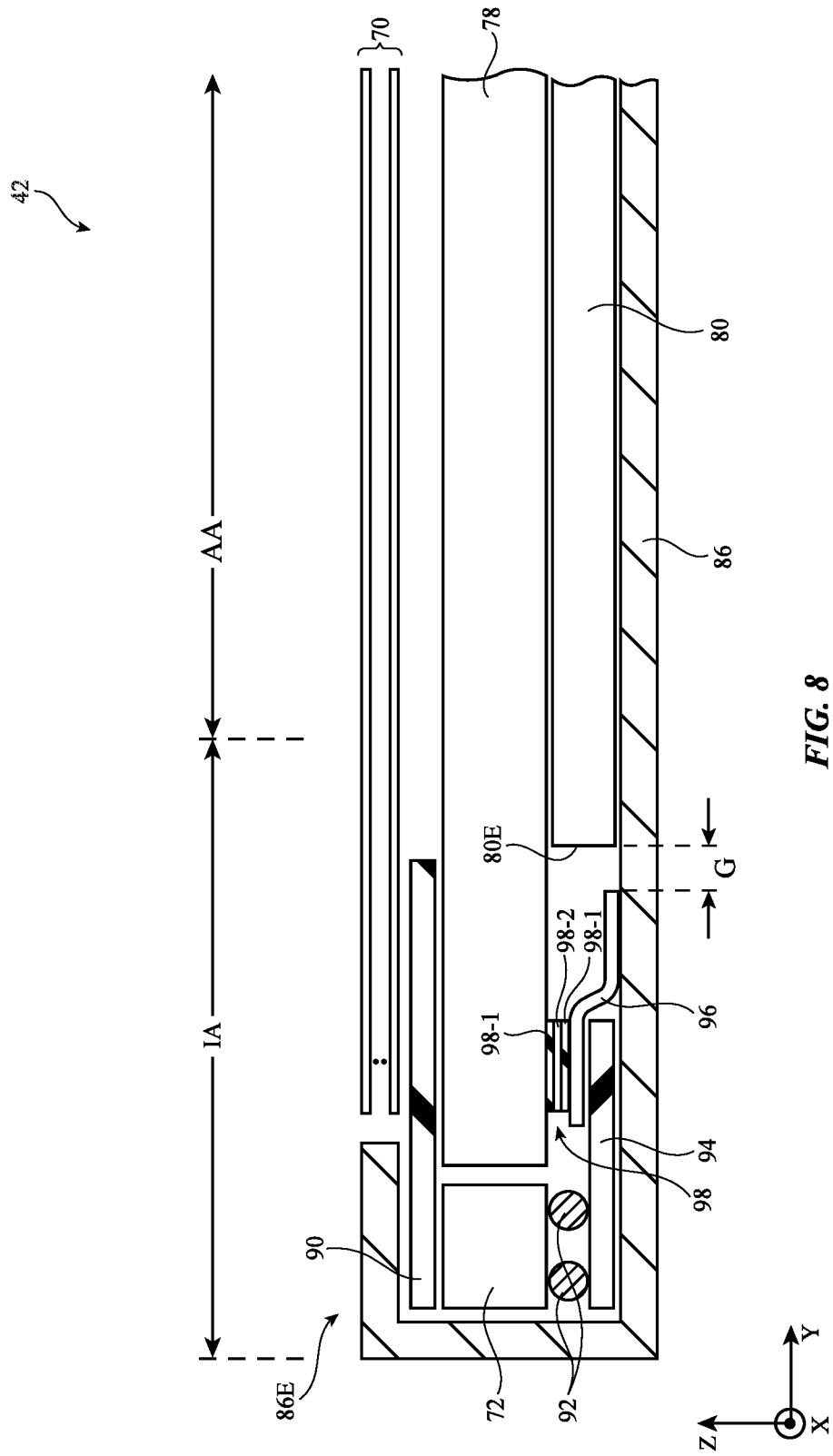
FIG. 8 is a cross-sectional side view of an illustrative backlight and associated light source in accordance with an embodiment.

A cross-sectional side view of backlight 42 is shown in FIG. 8. In the example of FIG. 8, light source (light-emitting diode) 72 is soldered to flexible printed circuit 94 using solder 92. Inactive area IA of display 14 may overlap the outer edge of light guide 78. Top reflector 90 may be formed from a strip of reflective material (e.g., white reflective tape formed from a polymer layer with a white ink coating, a strip of a polymer sheet with a white coating, and/or other reflective structures). Top reflector (reflector strip) 90 may have an outer edge that faces an outer wall of chassis 86 and may have an opposing inner edge that is aligned with or that slightly overlaps edge 80E of reflector 80. In this configuration, at least some of top reflector 90 overlaps light source (light-emitting diode) 72 and is interposed between the overhanging portion (metal chassis portion) of edge 86E of chassis 86 and each light-emitting diode in source 72. When top reflector 90 is interposed between light-emitting diodes 72 and chassis 86 in this way, moisture (e.g., water drops) that might condense on the inner surface of the overhanging chassis portion and that therefore might damage phosphor on light-emitting diodes 72 may be prevented from reaching light-emitting diodes 72.

Light guide fixing tape 98 may have a width (in dimension Y) of about 0.5-2 mm, about 1 mm, at least 0.4 mm, or less than 2.5 mm. Tape 98 (sometimes referred to as optically clear adhesive tape, optically clear adhesive, transparent adhesive, or clear adhesive) may have a transparent carrier layer such as polymer film layer 98-2 and opposing upper and lower clear adhesive coating layers 98-1. The upper adhesive coating layer 98-1 attaches tape 98 to light guide 78. The lower adhesive coating layer attaches tape 98 to a strip of reflective tape 96 (sometimes referred to as a reflector, reflective strip, reflector layer, reflector strip, etc.).

Reflective tape 96 may be formed form a white reflective tape or other reflective structure. The outer edge of reflective tape 96 may overlap flexible printed circuit 94 and may help enhance the reflectively of printed circuit 94 so that light is reflected upwards through layers 70 without excess light absorption near the periphery of backlight 42. The inner edge of reflective tape is separated by a gap G from opposing edge 80E of reflector 80. Gap G may have a width of 0.3 mm, at least 0.1 mm, at least 0.2 mm, at least 0.3 mm, less than 1 mm, less than 0.7 mm, 0.1-2 mm, or other suitable size. The presence of gap G may help satisfy assembly tolerances during manufacturing of backlight 42. At the same time, gap G may expose underlying metal portions of chassis 86 that absorb more light than reflector 80 and that therefore have the potential to create a dark band in backlight illumination 44 along the edge of display 14. The presence of tape 98 in a location that overlaps a portion of reflective tape 96 helps create light leakage from light guide 78 that counteracts the absorption of the exposed metal chassis layer in gap G and thereby helps prevent any dark bands from forming in backlight illumination 44 along the peripheral edge of display 14.

Figure 9:
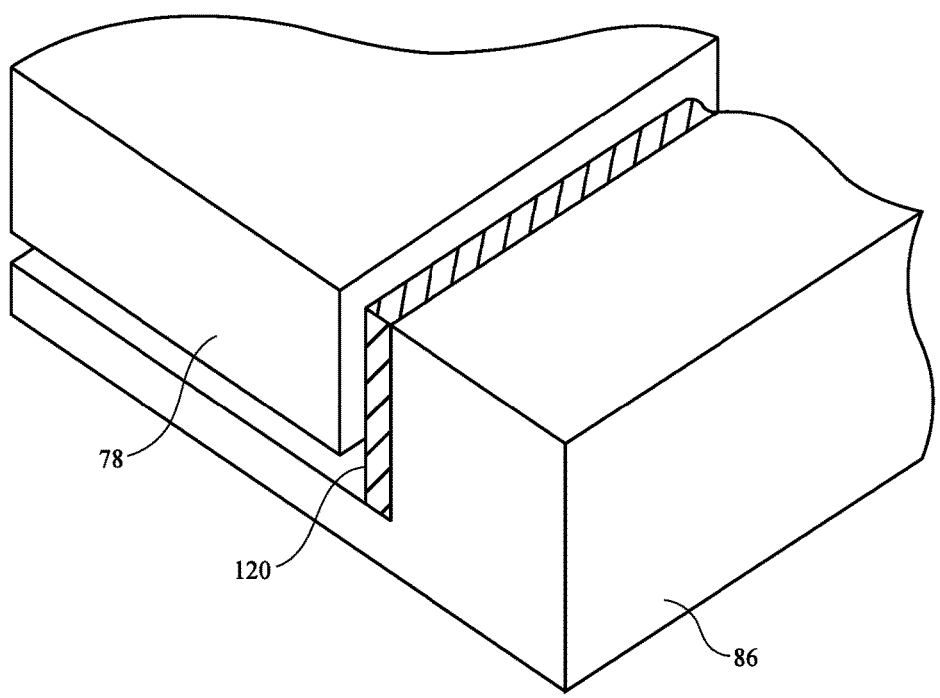
FIG. 9 is a perspective view of an illustrative edge of a backlight layer such as a light guide layer and an associated backlight chassis structure in accordance with an embodiment.

To prevent particles from being formed in the event that device 10 is inadvertently dropped, the inner surface of chassis 86 (e.g., the inner surface of a plastic portion of chassis 86, a metal portion of chassis 86, and/or other portions of chassis 86) may be provided with a layer of compressible material such as compressible layer 120 of FIG. 9. As shown in FIG. 9, compressible layer 120 (e.g., a layer of foam, a layer of elastomeric material, and/or other compressible material) may have one surface that is coupled to an inner sidewall surface of chassis 86 (e.g., with adhesive) and may have an opposing surface that faces the surface of the peripheral edge of light guide 78 and/or other backlight unit layers. This suppresses the formation of particles that might otherwise be formed (e.g., by chipping off of light guide 78) if light guide 78 were forced against chassis 86 directly during a drop event.

Figure 10:
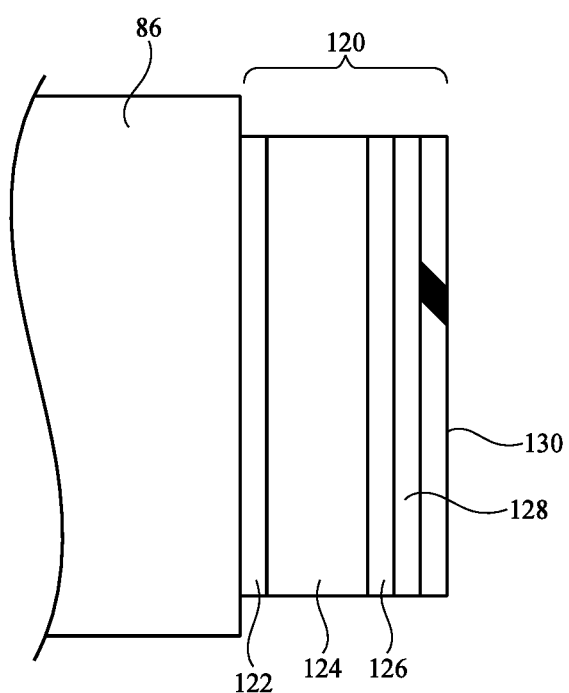
FIG. 10 is a cross-sectional side view of an illustrative foam layer of the type that may be mounted adjacent to an edge of a light guide layer and/or other backlight layers in accordance with an embodiment.

An illustrative configuration that may be used for forming compressible layer 120 is shown in the cross-sectional side view of FIG. 10. As shown in FIG. 10, layer 120 may be formed from a coated adhesive tape layer. The tape layer may have a first adhesive layer such as adhesive layer 122 for attaching layer 120 to the inner surface of chassis 86. Foam layer 124 may be formed from a compressible closed cell or open cell foam. Foam 124 may be black or other suitable color. Adhesive layer 126 may be used to couple foam layer 124 to polymer layer 128. Polymer layer 128 may be formed from a flexible sheet of polymer material such as a layer of polyethylene terephthalate (PET). Coating layer 130 may be formed from a reflective material such as white paint and may help match the appearance and reflectivity of layer 120 to the appearance and reflectivity of chassis 86 (e.g., plastic portions of chassis 86 such as white plastic portions). The presence of polymer layer 128 may help protect foam 124 and thereby reduce the likelihood of the formation of foam particles during drop events.

Figure 11:
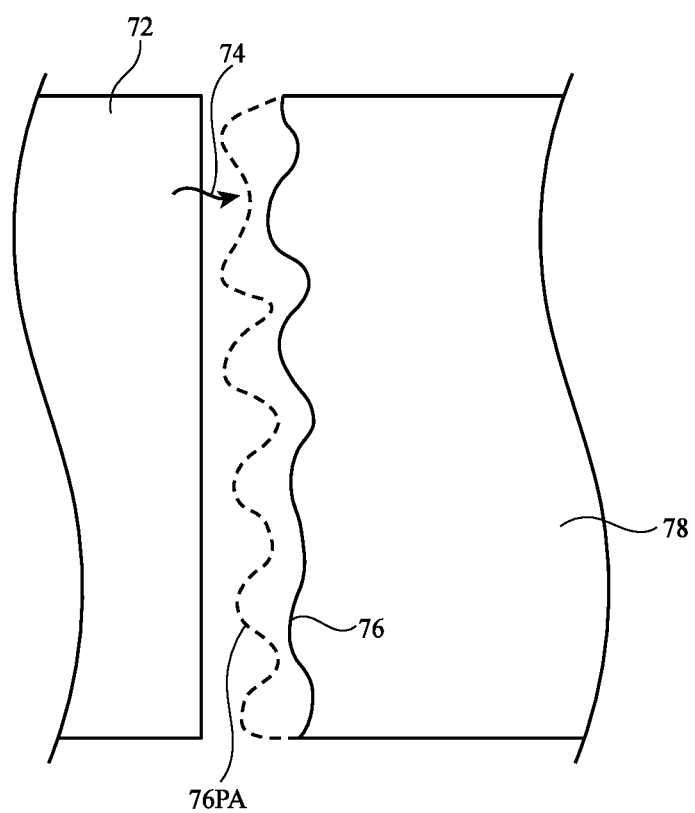
FIG. 11 is a cross-sectional side view of an illustrative light guide layer and associated light source such as a light-emitting diode in accordance with an embodiment.

By using computer-numerical-controlled polishing techniques, the edge roughness of light guide layer 78 may be reduced relative to that of raw die cut films. Die cut films may, as an example, have edge surfaces with a roughness average value (Ra value) of 0.3 microns. By using a polishing tool such as a computer numerical control (CNC) machine with a polishing head to polish edge 76 of light guide 78, the roughness of surfaces such as surface 76 of light guide 78 of FIG. 3 may be reduced to a roughness average value (Ra value) of less than 0.2 microns, less than 0.1 microns, less than 0.05 microns, 0.001-0.15 microns, or other suitable value). An Ra value of 0.3 microns is illustrated by surface 76PA of FIG. 11, whereas an Ra value of 0.2 microns or less is illustrated by surface 76 of FIG. 11. Reduced surface roughness may enhance coupling of light 74 into edge 76 by 7-10%.

Figure 12:
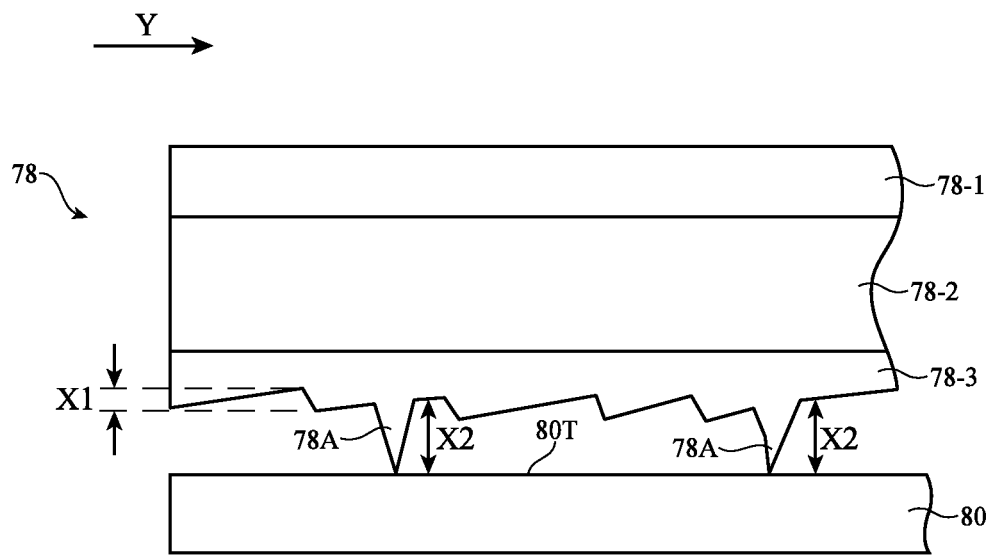
FIG. 12 a cross-sectional side view of a light guide layer with illustrative friction-reducing protrusions in accordance with an embodiment.
Figure 13:
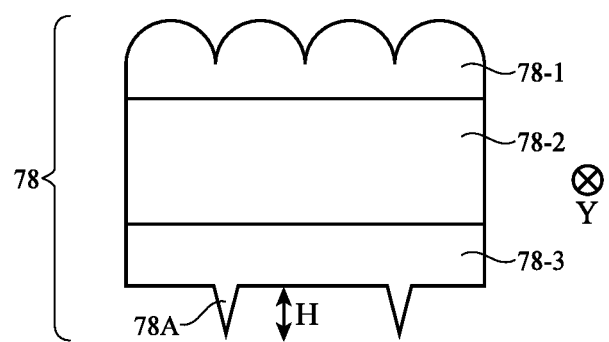
FIG. 13 is a cross-sectional end view of the illustrative light guide layer of FIG. 12 in accordance with an embodiment.

FIGS. 12 and 13 are cross-sectional side views of an illustrative light guide layer 78. As shown in FIGS. 12 and 13, light guide layer 78 may have a transparent film, molded light guide plate, or other transparent layer such as layer 78-2. Layer 78-2 may be a transparent polymer such as a layer of polycarbonate, a layer of polymethyl methacrylate (acrylic), or other clear plastic for guiding light 74 from light source 72 throughout display 14.

Layer 78-2 may have opposing outwardly facing and inwardly facing surfaces. An upper (outer) layer such as upper coating 78-1 may be formed the outwardly facing side of layer 78-2 (e.g., the side of layer 78 facing away from reflector 80). A lower (inner) layer such as lower coating 78-3 may be formed on the inwardly facing side of layer 78-2 (e.g., the side of layer 78 facing reflector 80). Coatings 78-1 and 78-3 may, if desired, be applied to layer 78-2 as liquid polymers in a roll-to-roll coating process. Following ultraviolet light curing or curing with other techniques, coating 78-1 and/or coating 78-3 may form solid layers on the opposing surfaces of layer 78-2 with recesses and/or protrusions that form light-scattering features. The light-scattering features may be patterned using embossing (stamping) during and/or after roll-to-roll processing, may be pattered using laser processing techniques, and/or may be formed using other processing techniques. These light-scattering structures may help extract light from layer 78-2 for use as backlight illumination 44.

As shown in FIG. 13, for example, upper coating 78-1 may have light-scattering features such as ridges or other protrusions to help scatter light 74 outwardly as backlight illumination 44. Lower coating 78-3 may also have light-scattering features (e.g., prism structures or other protruding and/or recessed light-scattering structures) to help scatter light 74 outwardly as backlight illumination 44. The ridges in upper coating 78-1 may, as an example, include elongated raised ridges that extend along light guide layer 78 away from light source 72. The light-scattering structures in lower coating 78-3 may be characterized by peak-to-valley distances of about 2-3 microns and lateral dimensions of about 10-30 microns (as an example).

To help reduce the coefficient of friction between coating 78-3 and surface 80T of reflector 80, coating 78-3 may be provided with additional protrusions (sometimes referred to as antifriction protrusions) such as protrusions 78A of height H. Protrusions 78A may be elongated ridges, bumps, and/or other features of height H. Height H, which represents a peak-to-valley distance associated with antifriction protrusions 78A, may have a value of about 4-7 microns, 5-7 microns, at least 2 microns, at least 4 microns, at least 5 microns, at least 6 microns, at least 7 microns, 5-10 microns, less than 20 microns, less than 10 microns, or other suitable size greater than the maximum peak-to-valley distance of the light-scattering structures in coating layer 78-3. There may be any suitable density of protrusions 78A on light guide layer 78 (e.g., 19 protrusions per square mm, 5-30 protrusions per square mm, at least 5 protrusions per square mm, at least 10 protrusions per square mm, fewer than 20 protrusions per square mm, fewer than 30 protrusions per square mm, or other suitable number of protrusions per square mm). In the presence of excessive friction between reflector 80 and layer 78, there is a risk that light guide layer 78 could stick to reflector 80 and drag reflector 80 laterally during thermal expansion. The use of antifriction protrusions 78A helps reduce friction between upper surface 80T of reflector 80 and the opposing lower surface of coating layer 78-3 and thereby helps prevent binding between reflector 80 and light guide layer 78 during expansion and contraction of light guide plate 78. The density and size of antifriction protrusions 78A generally makes these protrusions unsuitable for use as light-scattering features (e.g., light scattering is primarily performed by the prism structures in coating 78-3, not by protrusions 78A). At the same time, the greater height of protrusions 78A than the light-scattering features in layer 78-3 allows protrusions 78A to serve as effective antifriction structures.

Figure 14:
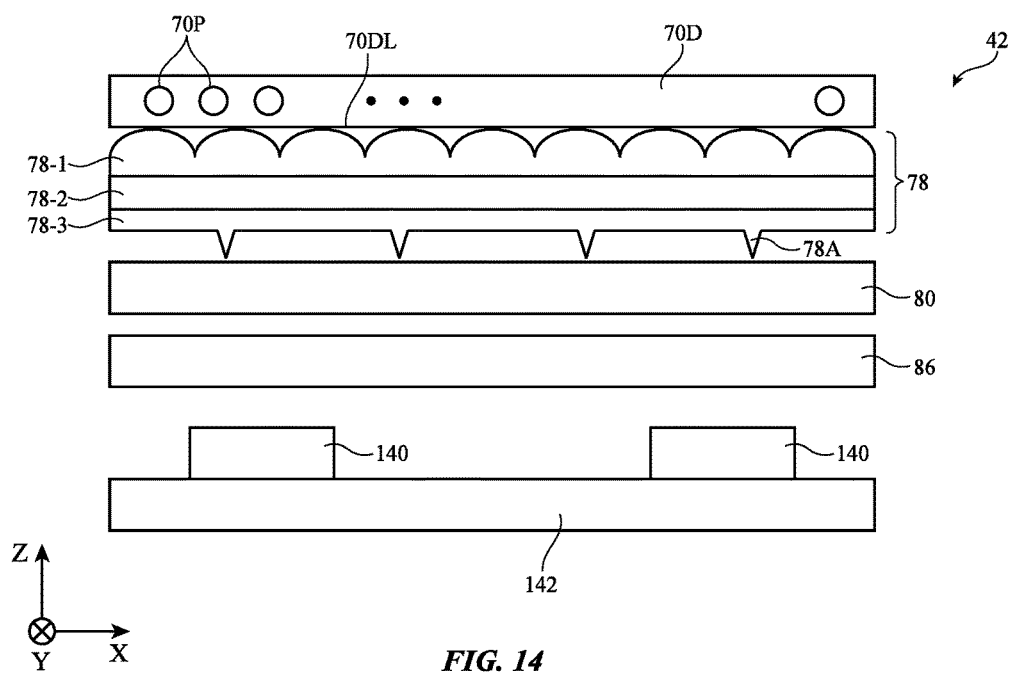
FIG. 14 is a cross-sectional side view of a portion of a backlight in accordance with an embodiment.

FIG. 14 shows how components 140 (integrated circuits, discrete components, etc.) may be mounted on a substrate such as printed circuit 142 under backlight 42. During use of device 10, printed circuit 142 may be pressed upwards in the +Z direction, which may cause components 140 to press against certain areas of chassis 86 (e.g., certain portions of a sheet metal layer forming a rear wall of chassis 86). This can give rise to different pressures on different areas of light guide layer 78 and can cause the ridges or other light scattering features of coating 78-1 to wet out where these features contact lower surface 70DL of diffuser 70D. Selective wetting out of light guide layer 78 against diffuser 70D creates a risk that undesirable white spots may become visible in active area AA of display 14. To prevent white spots, light guide layer 78 and/or lower diffuser 70D may have a hardness that is relatively high (e.g., pencil hardness values of H to 3H, at least H, at least 2H, or at least 3H). Layers 78 and/or 70D may, for example, be formed from polymers of H to 3H hardness. If desired, the hardness of layer 70D may be enhanced by using light-scattering particles 70P (e.g., polymer or glass beads) formed from hard materials (e.g., pencil hardness of at least H, at least 2H, or at least 3H).

Figure 15:
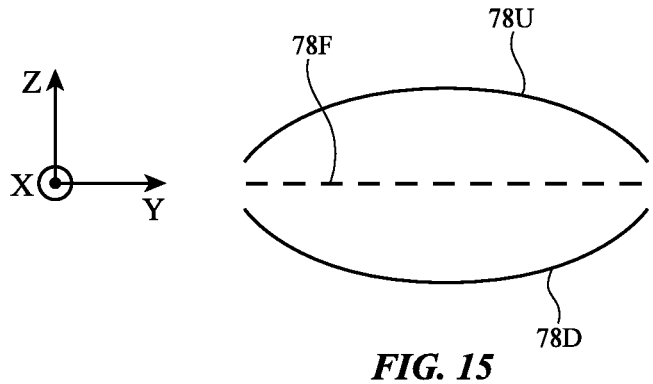
FIG. 15 is a side view of illustrative cupped and planar light guide layers in accordance with embodiments.

FIG. 15 shows how light guide layer 78 (e.g., a layer of molded acrylic or other clear plastic) may be flat (as shown by layer 78F), may be cupped downwardly (as shown by layer 78D, which has a convex surface facing outwardly toward display layers 46 and an opposing concave surface facing inwardly toward reflector 80), or may be cupped upwardly (as shown by layer 78U, which has a concave surface facing outwardly toward display layers 46 and a convex surface facing inwardly toward reflector 80). Due to the presence of moisture and heat, layer 78 will tend to bend and therefore form either the upward or downward cupping shapes of FIG. 15. To ensure that layer 78 has a desired shape (e.g., to avoid Moiré effects that might arise if layer 78 were raised towards films 70 in the center of device 10), layer 78 may be manufactured with a slight downward cup. This downward cupping bias ensures that any additional cupping of layer 78 will be in the downwards direction.

Figure 16:
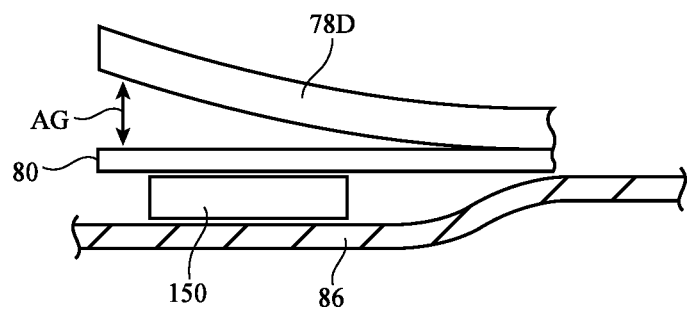
FIGS. 16 and 17 are cross-sectional side views of portions of illustrative backlight units with cupped light guide layers in accordance with embodiments.

FIG. 16 shows how the left edge of downwardly cupped light guide layer 78D will tend to separate from a reflector such as reflector 80 that is flat. This can arise when chassis 86 is bend downwardly to accommodate the thickness of adhesive tape 150 and thereby allows reflector 80 to assume a planar shape. In planar shape for reflector 80 of FIG. 16, an air gap AG develops between reflector 80 and light guide layer 78D that can lead to nonuniformity in the intensity of emitted backlight illumination 44.

Figure 17:
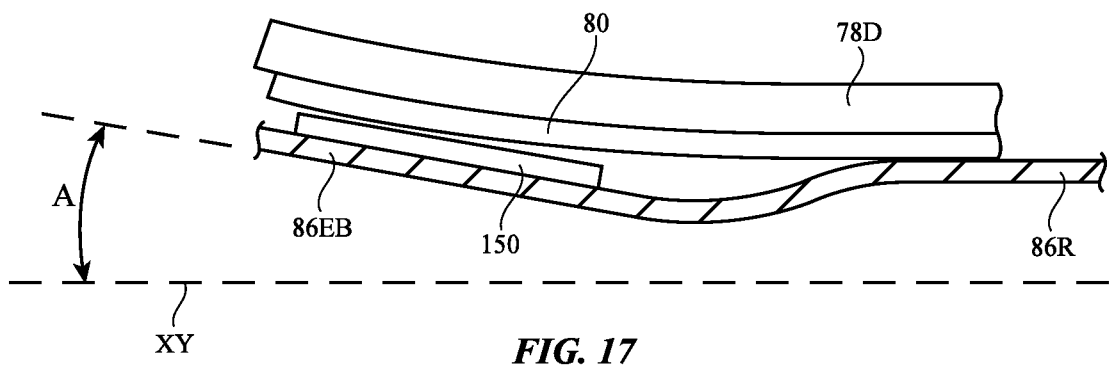

To avoid non-uniformity in backlight illumination 44, chassis 86 may have bent edge portions (portions along the periphery of display 14) such as metal chassis rear wall portion 86EB. Portion 86EB is angled at a non-zero angle A with respect to the XY plane and with respect to planar metal rear wall portion 86R of chassis 86, as shown in FIG. 17. The value of A may be, for example, 0.1-0.7°, at least 0.05°, at least 0.1°, at least 0.2°, at least 0.3°, less than 2°, less than 1°, less than 0.8°, or other suitable non-zero angle. As shown in FIG. 17, adhesive tape 150 may be used to help attach reflector 80 to chassis 86. Edge portion 86EB of chassis 86 is overlapped by tape 150, a corresponding edge portion of reflector 80, and a corresponding edge portion of layer 78D. Because at least edge portion 86EB is angled by at least non-zero angle A with respect to the XY plane, air gap AG is minimized or is absent and backlight nonuniformity is reduced.

Figure 18:
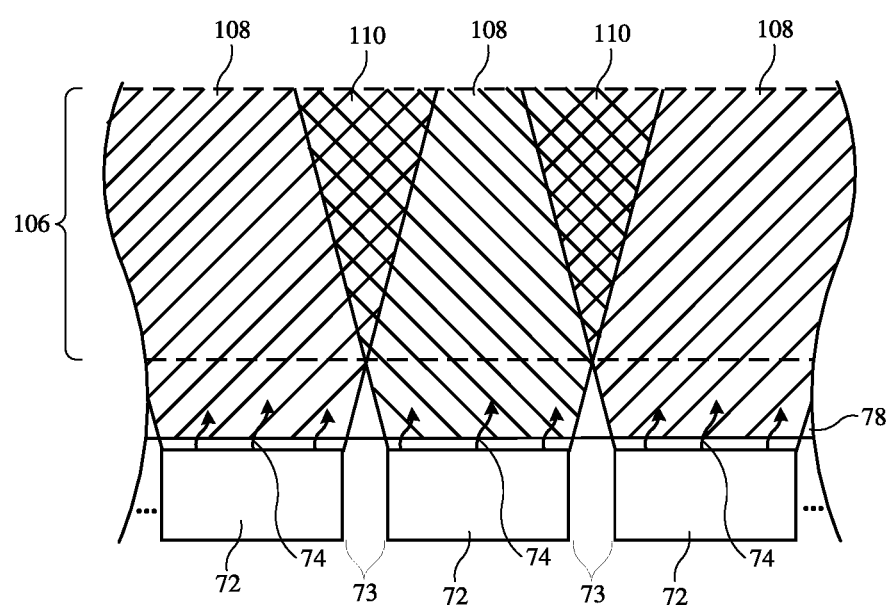
FIG. 18 is a top view of an edge portion of an illustrative light guide layer and associated light sources in accordance with an embodiment.

A top view of illustrative light sources 72 emitting light 74 into an edge of light guide layer 78 is shown in FIG. 18. As shown in FIG. 18, light 74 enters light guide layer 78 and begins to spread out within backlight mixing region 106. In regions 108 of light guide layer 78 (i.e., regions aligned with light sources 72), the light 74 from a light source 72 has not yet mixed with light 74 from adjacent light sources 72. In regions 110 of light guide layer 78 (i.e., regions aligned with gaps 73 between light sources 72), however, light 74 from multiple adjacent light sources 72 has mixed. Because regions 110 receive light 74 form multiple light sources 72, regions 110 will generally be brighter than regions 108, which receive light from only one light source 72. These differences in backlight intensity may result in nonuniformities in the backlight that is provided to display layers 46, and may cause undesirable visual artifacts (e.g., dark spots or hotspots) to appear in the active area AA of display 14.

Figure 19:
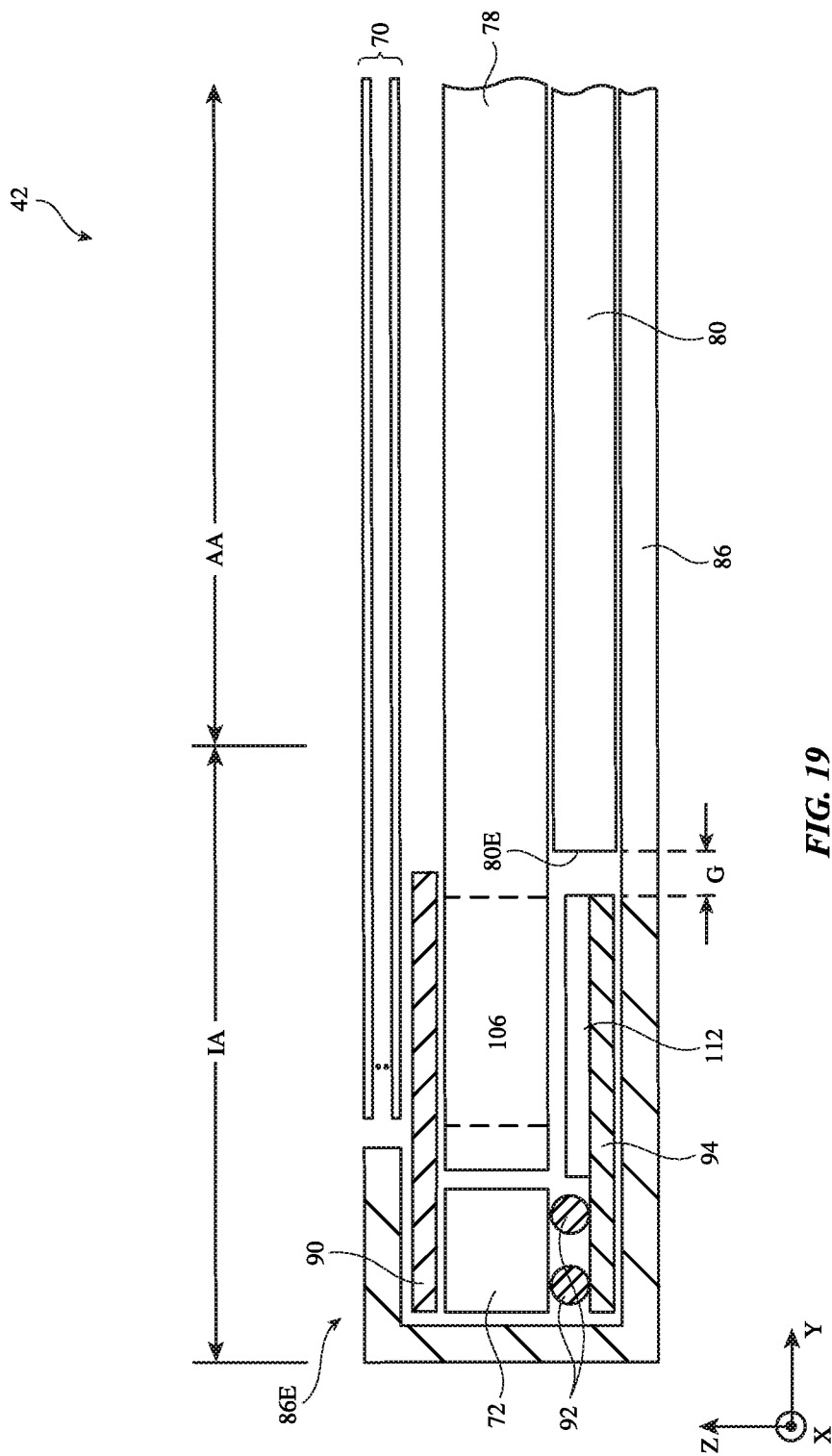
FIG. 19 is a cross-sectional side view of an illustrative backlight and associated light adjustment layer in accordance with an embodiment.

In order to reduce these backlight nonuniformities, backlight 42 may be provided with a light adjustment layer 112 (sometimes referred to herein as a backlight adjustment layer). A cross-sectional side view of an illustrative backlight 42 that includes a light adjustment layer 112 is shown in FIG. 19. As shown in FIG. 19, light adjustment layer 112 is interposed between light guide layer 78 and the printed circuit 94 on which light sources 72 are mounted. In the example of FIG. 19, light adjustment layer is beneath mixing region 106. If desired, light adjustment layer 112 may be a layer of tape with a pattern of printed ink or other suitable material that helps to reduce differences in backlight intensity in mixing region 106 and provide more uniform backlight to display layers 42. Light adjustment layer 112 is sometimes referred to as tape 112 or reflective tape 112.

Figure 20:
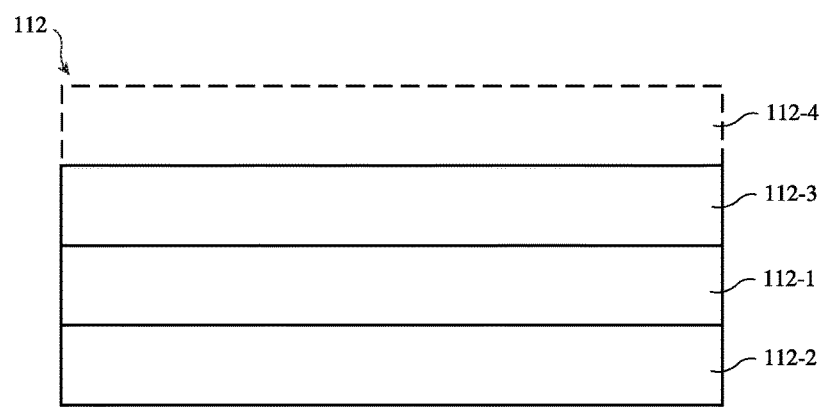
FIG. 20 is a cross-sectional side view of the illustrative light adjustment layer of FIG. 19 in accordance with an embodiment.

A cross-sectional side view of an illustrative light adjustment layer 112 is shown in FIG. 20. In the illustrative example of FIG. 20, light adjustment layer 112 is shown as a layer of tape that includes a base layer 112-1. If desired, base layer 112-1 may be a polymer such as polyethylene terephthalate, polycarbonate, polypropylene, or other suitable polymers. If desired, base layer 112-1 may be opaque (e.g., white, black, gray, yellow, red, blue, green, or another suitable color), transparent, translucent, or reflective (e.g., silver or another reflective color).

Base layer 112-1 may have opposing upper and lower surfaces. Tape 112 may include an adhesive layer 112-2 on the lower surface of base layer 112-1. Adhesive layer 112-2 may be pressure-sensitive adhesive, light-curable adhesive (e.g., UV-curable adhesive), optically clear adhesive, or another suitable adhesive. Adhesive layer 112-2 may adhere tape 112 to printed circuit 94.

Tape 112 may include a coating layer 112-3 on the upper surface of base layer 112-1. Coating layer 112-3 may be patterned or have other properties to help reduce backlight nonuniformities in mixing region 106. In one illustrative arrangement, coating layer 112-3 may be a layer of ink or pigment. The ink used in coating layer 112-3 may include black ink, white ink, grey ink, blue ink, red ink, yellow ink, green ink, ink of other suitable colors, or combinations of ink of different colors. If desired, reflective ink (i.e., light-reflecting ink that reflects light of a given wavelength or a given range of wavelengths) or absorptive ink (i.e., light-absorbing ink that absorbs light of a given wavelength or a given range of wavelengths) may be used in coating layer 112-3. In one illustrative embodiment, coating layer 112-3 is light-absorbing ink that is printed on some or all of base layer 112-1 in a pattern that helps reduce backlight nonuniformities in mixing region 106. For example, the ink in coating layer 112-3 may be printed on base layer 112-1 such that the regions of tape 112 that are aligned with light sources 72 (i.e., the regions of tape 112 that are below dim regions 108 of light guide layer 78) have a higher reflectivity (i.e., lower absorptivity) than the regions of tape 112 that are aligned with the gaps 73 between light sources 72 (i.e., the regions of tape 112 that are below bright regions 110 of light guide layer 78). As light 74 from light sources 72 mixes in mixing region 106, portions of tape 112 with greater reflectivity (i.e., portions of tape 112 that overlap with dim regions 108) will reflect more of the light 74 than portions of tape 112 with less reflectivity (i.e., portions of tape 112 that overlap with bright regions 110), thereby providing a more even distribution of light 74 with light guide layer 78 and reducing backlight nonuniformities.

Although coating layer 112-3 is described above as a layer of printed ink, this is merely illustrative. If desired, coating layer 112-3 may include reflective materials such as metals (e.g., silver, chrome, etc.) or reflective coatings (e.g., multilayer dielectric films) that overlap with dim regions 108 to help reflect light in these regions. In another suitable arrangement, coating layer 112-3 may include absorptive materials such as metals (e.g., black chrome) or other light-blocking materials (e.g., carbon black) that overlap bright regions 110 to help reduce light reflection in these regions. If desired, any combination of these materials may be used in coating layer 112-3 to help reduce backlight nonuniformities and minimize artifacts on display 14.

If desired, tape 112 may be provided with optional adhesive layer 112-4. Optional adhesive layer 112-4 may be provided on top of coating layer 112-3 and may adhere tape 112 to the lower surface of light guide layer 78.

Figure 21:
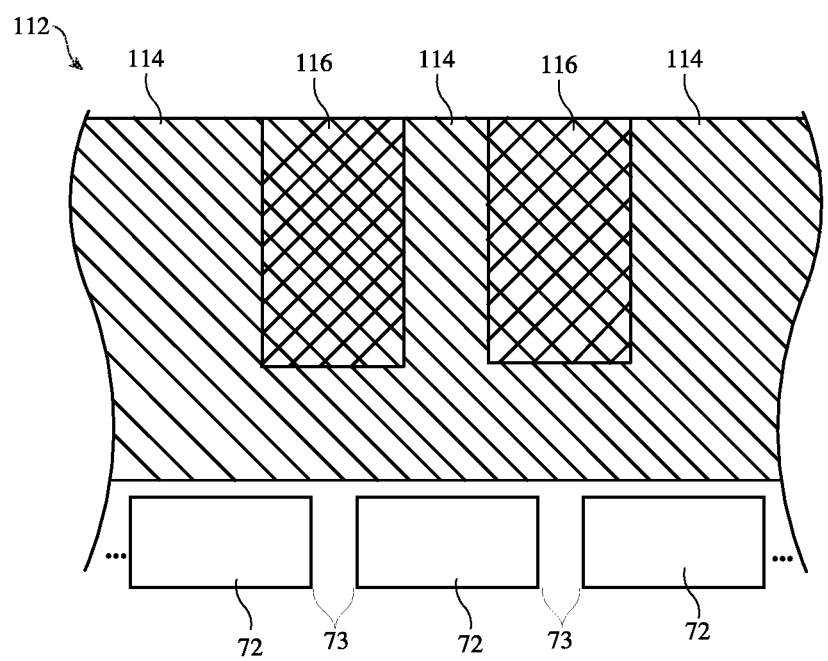
FIGS. 21 and 22 are top views of illustrative light adjustment layers in accordance with embodiments.

A top view of an illustrative light adjustment layer 112 and associated light sources 72 is shown in FIG. 21. In the example of FIG. 21, light adjustment layer 112 includes regions 114 and regions 116. Regions 114 and 116 are arranged in a pattern in which regions 116 are interposed between regions 114, and are sometimes referred to herein as alternating regions. As described above in connection with FIG. 18, dim portions 108 of light guide layer 78 tend to be aligned with light sources 72, while bright portions 110 of light guide layer 78 tend to be aligned with the gaps 73 between light sources 72. In order to minimize these backlight nonuniformities, light adjustment layer 112 may be provided below light guide 78 in mixing region 106. In the illustrative example of FIG. 21, regions 114 of light adjustment layer 112 are aligned with light sources 72 (i.e., are under dim regions 108) and have a first reflectivity, and regions 116 are aligned with the gaps 73 between light sources 72 (i.e., are under bright regions 110) and have a second reflectivity that is less than the first reflectivity. By arranging light adjustment layer 112 in this way, the amount of light that is reflected off of light adjustment layer 112 in bright regions 110 may be reduced, thereby reducing backlight nonuniformities between regions 108 and 110.

In one illustrative arrangement, light adjustment layer 112 of FIG. 21 may include an ink layer 112-3 (e.g., a light-absorbing ink layer) printed on base layer 112-1. In such an arrangement, the ink layer 112-3 may be printed more densely in regions 116 than in regions 114 (i.e., regions 116 may be darker than regions 114) so as to reduce the reflectivity of regions 116 relative to regions 114. In this way, light adjustment layer 112 may be described as including an ink layer 112-3 having darkened portions that are aligned with gaps 73 between light sources 72. This, however, is merely illustrative. If desired, any suitable combination of materials for coating layer 112-3 as described above in connection with FIG. 20 may be used to provide an arrangement of the type shown in FIG. 21.

Figure 22:
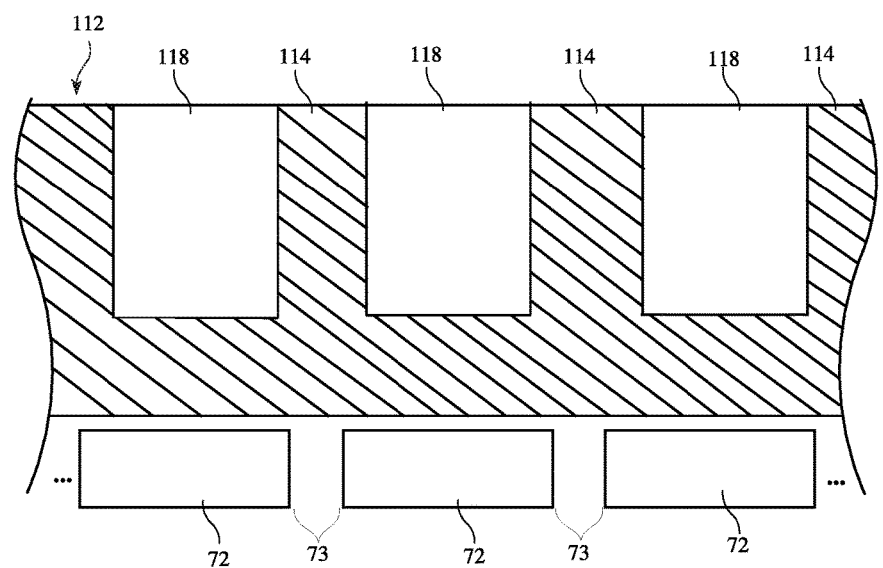

A top view of an illustrative light adjustment layer 112 and associated light sources 72 is shown in FIG. 22. In the example of FIG. 22, light adjustment layer 112 includes regions 114 and regions 118. Regions 114 and 118 are arranged in a pattern in which regions 118 are interposed between regions 114, and are sometimes referred to herein as alternating regions. In the illustrative example of FIG. 22, regions 118 are aligned with light sources 72 (i.e., are under dim regions 108) and have a first reflectivity, and regions 114 are aligned with the gaps 73 between light sources 72 (i.e., are under bright regions 110) and have a second reflectivity that is less than the first reflectivity. By arranging light adjustment layer 112 in this way, the amount of light that is reflected off of light adjustment layer 112 in dim regions 108 may be increased, thereby reducing backlight nonuniformities between regions 108 and 110.

In one illustrative arrangement, light adjustment layer 112 of FIG. 22 may include an ink layer 112-3 (e.g., a light-absorbing ink layer) printed on base layer 112-1. In such an arrangement, the ink layer 112-3 may be printed in regions 114, but may not be printed (or may be removed after printing) in regions 118 so as to increase the reflectivity of regions 118 relative to regions 114. In this way, light adjustment layer 112 may be described as including an ink layer 112-3 having cutout regions that do not include ink and that are aligned with light sources 72. This, however, is merely illustrative. If desired, any suitable combination of materials for coating layer 112-3 as described above in connection with FIG. 20 may be used to provide an arrangement of the type shown in FIG. 22.

In the illustrative examples of FIGS. 21 and 22, darkened regions 116 and cutout regions 118 have rectangular shapes. This, however, is merely illustrative. If desired, darkened regions 116 and cutout regions 118 may have triangular shapes, elliptical shapes, circular or semi-circular shapes, trapezoidal shapes, or other suitable shapes.

The foregoing is merely illustrative and various modifications can be made to the described embodiments. The foregoing embodiments may be implemented individually or in any combination.

What is claimed is:

1. Apparatus, comprising:
   display layers that form an array of pixels configured to display images; and
   backlight structures that provide backlight illumination that passes through the array of pixels, wherein the backlight structures include:
   a printed circuit;
   a light-emitting diode mounted on the printed circuit;
   a reflector adjacent to the printed circuit;
   a strip of reflective tape adhered to the printed circuit, wherein the strip of reflective tape has a first region with a first reflectivity and a second region with a second reflectivity that is different than the first reflectivity, wherein the first region is aligned with the light-emitting diode, and wherein the strip of reflective tape comprises a white polymer in the first region; and
   a light guide layer overlapping the reflector and the strip of reflective tape.

2. The apparatus defined in claim 1, wherein the strip of reflective tape comprises:
   a base layer;
   an adhesive layer that adheres the strip of reflective tape to the printed circuit; and
   a patterned ink layer that forms the first and second regions.

3. The apparatus defined in claim 2, wherein the base layer comprises the white polymer.

4. The apparatus defined in claim 3, wherein the patterned ink layer comprises light-absorbing ink.

5. The apparatus defined in claim 4, wherein the first region is aligned with the light-emitting diode, wherein the light-absorbing ink is absent from the first region, and wherein the first reflectivity is greater than the second reflectivity.

6. The apparatus defined in claim 4, wherein the patterned ink layer in the first region has a first absorptivity, and wherein the patterned ink layer in the second region has a second absorptivity that is greater than the first absorptivity.

7. The apparatus defined in claim 6, wherein the first region is aligned with the light-emitting diode.

8. The apparatus defined in claim 1, wherein the strip of reflective tape reduces nonuniformities in the backlight illumination that passes through the array of pixels.

9. A display, comprising:
   display layers that include an array of pixels for displaying images; and
   backlight structures that provide backlight illumination for the array of pixels, wherein the backlight structures include:
   a light guide layer having an edge;
   light-emitting diodes that emit light into the edge of the light guide layer;
   a printed circuit on which the light-emitting diodes are mounted; and
   a patterned light adjustment layer between the printed circuit and the light guide layer, wherein the patterned light adjustment layer has alternating regions that reflect different amounts of light from the light-emitting diodes, wherein the alternating regions comprise first regions that are aligned with the light-emitting diodes and second regions that are aligned with gaps between the light-emitting diodes, wherein the first regions are more reflective than the second regions, and wherein there is a gap between the patterned light adjustment layer and the light guide layer.

10. The display defined in claim 9, wherein the patterned light adjustment layer comprises a layer of light-absorbing ink.

11. The display defined in claim 10, wherein the layer of light-absorbing ink is at least partially removed from the first regions.

12. The display defined in claim 10, wherein the second regions comprise more of the light-absorbing ink than the first regions.

13. The display defined in claim 9, wherein the array of pixels defines an active area of the display, wherein the active area is surrounded by an inactive area of the display, and wherein the patterned light adjustment layer is in the inactive area of display.

14. Backlight structures, comprising:
a light guide layer;
light-emitting diodes that emit light into the light guide layer, wherein the light-emitting diodes are separated by gaps;
a printed circuit, wherein the light-emitting diodes are mounted on the printed circuit; and
tape interposed between the printed circuit and the light-guide layer, wherein the tape comprises:
a base layer having first and second opposing surfaces;
first adhesive on the first surface, wherein the first adhesive attaches the tape to the printed circuit;
a coating on the second surface, wherein a first portion of the coating that is aligned with the light-emitting diodes has a first absorptivity, and wherein a second portion of the coating that is aligned with the gaps has a second absorptivity that is greater than the first absorptivity; and
second adhesive on the coating, wherein the second adhesive attaches the tape to the light guide layer.

15. The backlight structures defined in claim 14, wherein the base layer comprises white polymer.

16. The backlight structures defined in claim 15, wherein the coating comprises light-absorbing ink printed on the white polymer.

17. The backlight structures defined in claim 16, wherein the light-absorbing ink has the first absorptivity in the first portion of the coating and has the second absorptivity in the second portion of the coating.

18. The backlight structures defined in claim 14, wherein the first portion of the coating is formed from a first material, and wherein the second portion of the coating is formed from a second material that is different than the first material.

* * * * *